(12) United States Patent
Bandi et al.

(10) Patent No.: US 9,742,603 B1
(45) Date of Patent: Aug. 22, 2017

(54) LINK TRAINING TO RECOVER ASYNCHRONOUS CLOCK TIMING MARGIN LOSS IN PARALLEL INPUT/OUTPUT INTERFACES

(71) Applicant: INTEL CORPORATION, Santa Clara, CA (US)

(72) Inventors: Chenchu Punnarao Bandi, Bayan Lepas (MY); Amit Kumar Srivastava, Bayan Lepas (MY); Sabyasachi Mohapatra, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/363,075

(22) Filed: Nov. 29, 2016

(51) Int. Cl.
| | |
|---|---|
| *H03D 3/24* | (2006.01) |
| *H04L 27/152* | (2006.01) |
| *H04L 7/00* | (2006.01) |
| *H04L 7/033* | (2006.01) |

(52) U.S. Cl.
CPC .......... *H04L 27/152* (2013.01); *H04L 7/0079* (2013.01); *H04L 7/0331* (2013.01)

(58) Field of Classification Search
CPC ........... H04L 5/1446; H04L 2001/0094; H04L 29/06068; H04L 69/08; H04L 7/0008; H04L 7/0091; H04L 41/22; H04L 47/34; G06F 13/4217; G06F 13/4063; G06F 13/4213; G06F 13/4291
USPC ......... 375/354, 376, 356, 355, 358; 370/509
See application file for complete search history.

(56) References Cited

U.S. PATENT DOCUMENTS 7,187,598 B1 * 3/2007 Daugherty .......... G06F 13/1689
365/189.15

\* cited by examiner

*Primary Examiner* — Rahel Guarino
(74) *Attorney, Agent, or Firm* — Lowenstein Sandler LLP

(57) ABSTRACT

In accordance with embodiments disclosed herein, there is provided systems and methods for link training between a host device and a device. The host device includes a clock source, front-end circuitry, a duty cycle monitor (DCM), link training logic, and a duty cycle adjustor (DCA). The front-end circuitry is to transmit a training sequence and a forward clock signal to the device and is to receive a strobe signal from the device over a physical transmission media. The DCM is to monitor duty cycle of the strobe signal and duty cycle of the clock signal. The link training logic is to determine a adjustment to the clock signal and is to generate a control signal. The DCA is to receive the clock signal and the control signal and is to adjust the clock signal to generate an adjusted forward clock signal in view of the control signal.

24 Claims, 9 Drawing Sheets

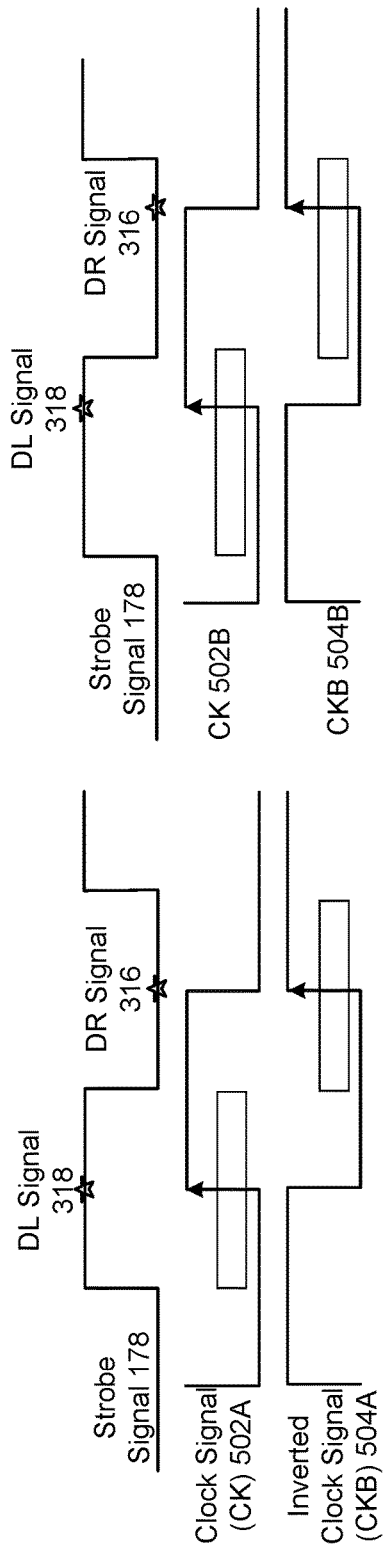
FIG. 5A
FIG. 5B
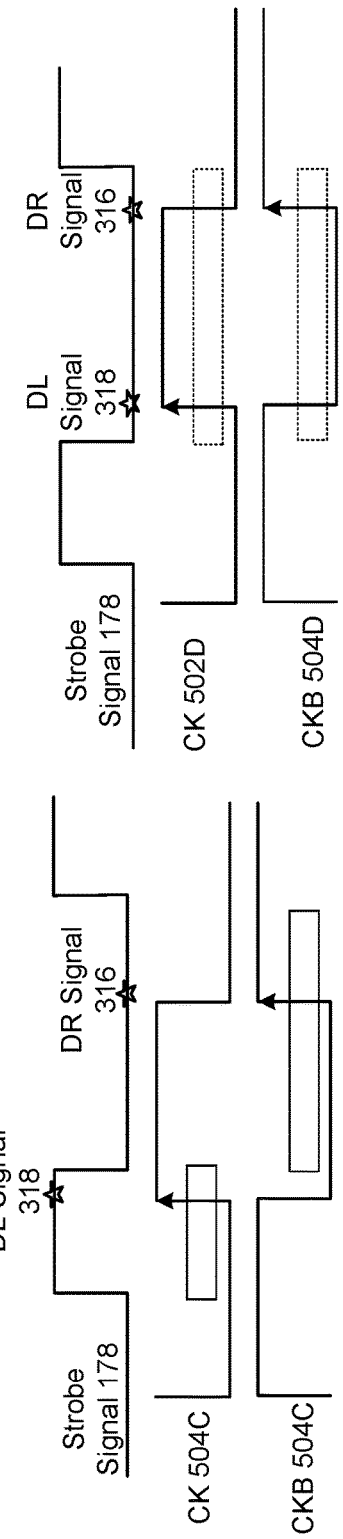
FIG. 5C
FIG. 5D

LINK TRAINING TO RECOVER ASYNCHRONOUS CLOCK TIMING MARGIN LOSS IN PARALLEL INPUT/OUTPUT INTERFACES

BRIEF DESCRIPTION OF THE DRAWINGS

FIG. 5A illustrates a strobe signal with an even, centered duty cycle, according to one embodiment.

FIG. 5B illustrates a strobe signal with an even, non-centered duty cycle, according to one embodiment.

FIG. 5C illustrates a strobe signal with an uneven duty cycle in different unit intervals, according to one embodiment.

FIG. 5D illustrates a strobe signal with an uneven duty cycle in the same unit interval, according to one embodiment.

DESCRIPTION OF EMBODIMENTS

Figure 1A:
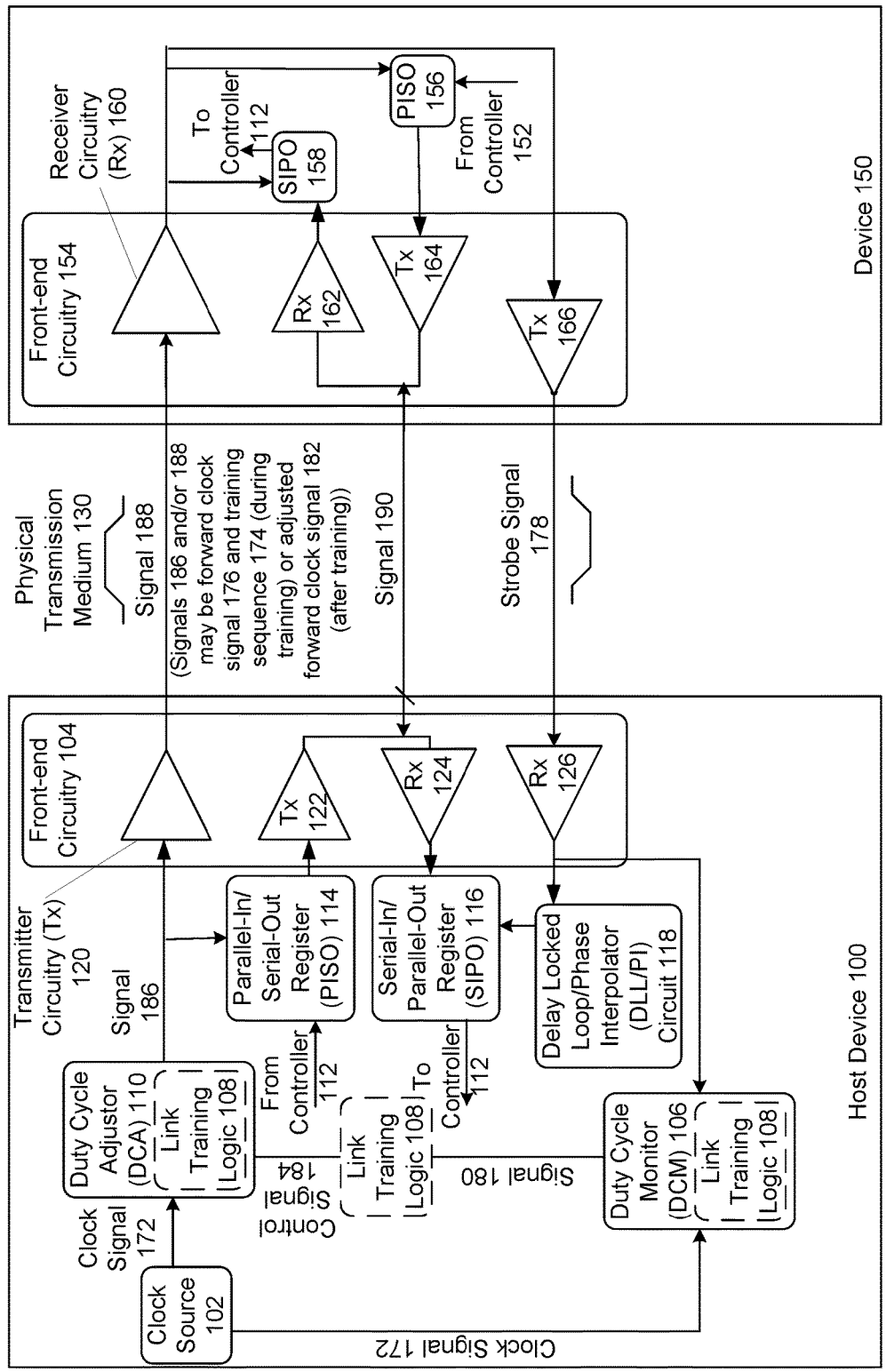
FIG. 1A illustrates a host device and a device in an interconnect architecture with link training logic, according to one embodiment.

High-speed, parallel-source, asynchronous interfaces (double data rate (DDR), low-power DDR (LPDDR), embedded multimedia card (eMMC) and secure digital input/output (SDIO), etc.) have a clock source at a host device and transmit a forward clock signal from the host device to a device through a physical transmission media. The device (e.g., an inexpensive device) may not have a clock source and the device may use a received forwarded clock signal from the host device for device data transactions. Using the clock source of the host device at the device imposes serious system asynchronous clock (AC) timing issues (e.g., due to non-linearity of the physical transmission media, etc.). This is especially the case where host device is in read mode, where the clock signal traverses from the host device to the device and then traverses from device to the host device. AC timing margin loss may be more severe when a physical transmission media operates in DDR mode. During host read mode, the host device may see a strobe signal suffer from duty cycle distortion (DCD), reflection due to channel impedance mismatch, and skew (e.g., systematic induced, physical transmission media induced, both systematic and physical transmission media induced, etc.). At the device end, there is no dedicated phase-locked loop (PLL) circuit or de-skew circuit to compensate for AC timing losses which results in read data by the host device, in some implementations, not being reliable.

Conventional solutions have duty cycle correction at the host device and are not effective. In conventional solutions, the correction technique at the host device only filters host-to-device timing loss up to a certain extent, but the correction technique is not able to compensate for the device-to-host timing losses. Some conventional solutions use digital techniques at the host device to use a distorted clock signal to correct a duty cycle. Some conventional solutions use an analog technique which is more prone to process variation, has a sensitivity towards noise when implemented for lower process technology nodes, and the solution may not be robust.

The devices, systems, and methods, as disclosed herein, provide link training between the host device and the device. The link training is to mitigate read AC timing loss where the host device receives and detects the degraded strobe signal and adjusts the forward clock at the clock source so that the host device obtains a substantial timing margin within the defined clock duty cycle requirement. The link training may mitigate AC timing loss at the host device by detected DCD (e.g., during read mode) using a clean crystal clock source and may tune the forwarding clock signal from the host device to the device.

The link training between the host device and the device provides a better solution than the conventional solutions. The link training solves the AC timing margining loss for the device without using a filtering mechanism either through a PLL circuit or a de-skew circuit. The link training may occur during a system cold boot. The link training corrects and improves timing margin by detecting a received strobe signal which may have already had losses at the host device. The link training does not include downsides (e.g., process variation, supply variation, etc.) of analog techniques. The link training has an algorithm that completes within a few microseconds (µs) and is faster than conventional solutions. The link training uses a setting (e.g., a setting that is better than conventional settings) based on various data patterns (e.g., stress patterns, training sequences) during a training mode.

FIG. 1A illustrates a host device 100 and a device 150 in an interconnect architecture with link training logic, according to one embodiment.

The host device 100 includes a clock source 102, front-end circuitry 104, a duty cycle monitor (DCM) 106, link training logic 108, a duty cycle adjustor (DCA) 110. The host device 100 may also include a controller 112, a parallel-in/serial-out register (PISO) 114, and a serial-in/parallel-out register (SIPO) 116, and a delay-locked loop/phase interpolator (DLL/PI) circuit 118. The front-end circuitry 104 of the host device 100 may include transmitter circuitry (Tx) 120, Tx 122, receiver circuitry (Rx) 124, and Rx 126.

The host device 100 is coupled to the device 150 via a physical transmission medium 130 (e.g., the device 150 is coupled to the physical transmission medium 130 and the host device 100 is coupled to physical transmission medium 130).

The physical transmission medium 130 may refer to any physical path for transmitting data, such as a transmission line, a copper line, an optical line, or other communication path. The physical transmission medium 130 may include mechanical components, electrical components, or any combination thereof to provide a wired communication link (e.g., provide an electrical, mechanical, and procedural interface). The physical transmission medium 130 may be a point-to-point communication channel between host device 100 and device 150 allowing both host device 100 and device 150 to send and receive signals. At the physical level, the physical transmission medium 130 may be composed of one or more lanes. Low-speed peripherals (such as a card using the 802.11 Wi-Fi® technology) use a single-lane (×1) link, while a graphics adapter typically uses a much wider and faster 16-lane link.

The device 150 may include a controller 152, front-end circuitry 154, a PISO 156, and SIPO 158. The front-end circuitry 154 of the device 150 may include Rx 160, Rx 162, Tx 164, and Tx 166. The device 150 may not include a clock source.

The clock source 102 generates a clock signal 172. The clock source 102 may be used to double data rate traffic between the host device 100 and the device 150. The front-end circuitry 104 (e.g., Tx 120) of the host device 100 is coupled to the clock source 102. The front-end circuitry 104 (e.g., Tx 120) is to transmit, to device 150 (e.g., to front-end circuitry 154 (e.g., to Rx 160)) over a physical transmission medium 130, a signal 188 (e.g., signal 186, a training sequence 174 and a forward clock signal 176, and double edge data) during a training period. The forward clock signal 176 is derived from the clock signal 172.

The front-end circuitry 154 (e.g., Rx 160) of the device 150 may transmit the signal 188 to the SIPO 158, the PISO 156, and the front-end circuitry 154 (e.g., Tx 166). The front-end circuitry 154 (e.g., Tx 166) of the device 150 may transmit the strobe signal 178 (e.g., accompanied with the double edge data) to the front-end circuitry 104 (e.g., Rx 126) of the host device 100. The strobe signal 178 may include one or more of the training sequence 174 or the forward clock signal 176, as affected by one or more of the physical transmission medium 130 (e.g., non-linearity of the physical transmission medium 130, from being transmitted from the host device 100 to the device 150 and from being transmitted from the device 150 to the host device 100), the host device 100, or the device 150.

The front-end circuitry 104 (e.g., Rx 126) is to receive the strobe signal 178 from the device 150 over the physical transmission medium 130 during the training period. The front-end circuitry 104 (e.g., Rx 126) may transmit the strobe signal to the DLL/PI circuit 118 and the DCM 106.

The DCM 106 is coupled to the clock source 102 and the front-end circuitry 104. The DCM 106 is to monitor a first duty cycle of the strobe signal 178 and a second duty cycle of the clock signal 172 during the training period. The DCM 106 may monitor duty cycle of the received strobe signal 178 and compare the duty cycle of the received strobe signal 178 with duty cycle (e.g., available good duty cycle) of the clock signal 172. DCM 106 may transmit a signal 180 to link training logic 108. The signal 180 may be derived from the first duty cycle of the strobe signal 178 and a second duty cycle of the clock signal 172.

The link training logic 108 is coupled to the DCM 106. In one embodiment, the DCM 106 includes the link training logic 108. In one embodiment, the link training logic 108 is separate from the DCM 106 and the DCA 110. In one embodiment, the DCA 110 includes the link training logic 108. The link training logic 108 is to determine an adjustment to the clock signal 172 or adjustment to the forward clock signal 176) to correct the forward clock signal 176 to obtain an adjusted forward clock signal 182 for communications between the host device 100 and the device 150 after the training period. The link training logic 108 is to generate a control signal 184 in view of the adjustment to correct the forward clock signal 176. In one embodiment, the link training logic 108 determining the adjustment to the clock signal 172 includes determining that a difference between the first duty cycle and the second duty cycle is not within an accuracy limit and determining the adjustment to the clock signal 172 to correct the difference to be within the accuracy limit. In one embodiment, the link training logic 108 determining the adjustment to the clock signal 172 includes determining that a duty cycle distortion (DCD) of the forward clock signal 176 is not within a threshold range and determining the adjustment to the clock signal 172 to correct the DCD of the forward clock signal 176 to be within the threshold range.

The link training logic 108 may send a first command code to the device 150 to indicate commencement of the training period. The link training logic 108 may enable one or more of the DCA 110, the DCM 106, and the front-end circuitry 104 (e.g., Rx 126). The link training logic 108 may initiate transmitting, by the front-end circuitry 104 (e.g., Tx 120), the training sequence 174. The link training logic 108 may receive, from the DCM 106, a lock indication that at least one of the first duty cycle of the strobe signal 178 has been adjusted within a defined range or the forward clock signal 176 has reached a maximum accuracy limit. The link training logic 108 may lock adjustment of the forward clock signal 176 in view of the lock indication. The link training logic 108 may transmit a second command code to the device 150 to indicate the training period is complete and to proceed to normal boot flow (e.g., non-training period flow, etc.).

The DCA 110 is coupled between the clock source 102 and the front-end circuitry 104 and is coupled to the DCM 106. The DCA 110 is to receive the clock signal 172 from the clock source 102 and the control signal 184 from the DCM 106. The DCA 110 is to adjust the clock signal 172 to generate the adjusted forward clock signal 182 in view of the control signal 184 (e.g., to cause strobe signal 178 to have an improved duty cycle for timing margin in view of the control signal 184). The DCA 110 is to transmit a signal 186 to the Tx 120 and the PISO 114. During the training period, the signal 186 may include a training sequence 174 and the forward clock signal 176. After the training period, the signal 186 may be the adjusted forward clock signal 182. After the training period, the front-end circuitry 104 (e.g., Tx 120) of host device 100 receives signal 186 from DCA 110 and transmits signal 188 (e.g., adjusted forward clock signal 182) to the device 150. The host device 100 may generate the adjusted forward clock signal 182 without receiving an acknowledgement from the device 150. The host device 100 may one or more of generate the adjusted forward clock signal 182 through software (e.g., carry out the link training through software without receiving an acknowledgement from the device), generate the adjusted forward clock signal 182 as part of BIOS (e.g., basic input/output system) during boot time (carry out the link training as part of BIOS booting time without receiving an acknowledgement from the device, carry out in the background in boot flow, etc.), or generate the adjusted forward clock signal 182 in a functional mode (e.g., carry out adjustments in functional mode without receiving an acknowledgement from the device, special command signals, etc.).

In one embodiment, the DLL/PI circuit 118 of the host device 100 is to receive the strobe signal 178 from the device 150 and the DLL/PI circuit 118 is to generate a first signal. The PISO 114 is to receive a second signal from the controller 112 of the host device 100 and the signal 186 (e.g., forward clock signal 176) from the clock source 102. The PISO 114 is to generate a third signal. The SIPO 116 is to receive a signal 190 (e.g., uni/bi-directional SDR/DDR-data signal) from the device 150 (e.g., transmitted by the front-end circuitry 154 (e.g., Tx 164) to front-end circuitry 104 (e.g., Rx 124)), the third signal from the PISO 114, and the first signal from the DLL/PI circuit 118. The SIPO 116 is to output a fifth signal to the controller 112.

In one embodiment, the PISO 156 of the device 150 is to receive a sixth signal from a controller 152 and the signal 188 from front-end circuitry 154 (e.g., Rx 160). The PISO 156 is to generate a seventh signal. The SIPO 158 is to receive an eighth signal from the host device 100 (e.g., transmitted by the front-end circuitry 104 (e.g., Tx 122) to front-end circuitry 154 (e.g., Rx 162)), the signal 188 from front-end circuitry 154 (e.g., Rx 160), and the seventh signal from the PISO 156. The SIPO 158 is to output a ninth signal to the controller 152.

Figure 1B:
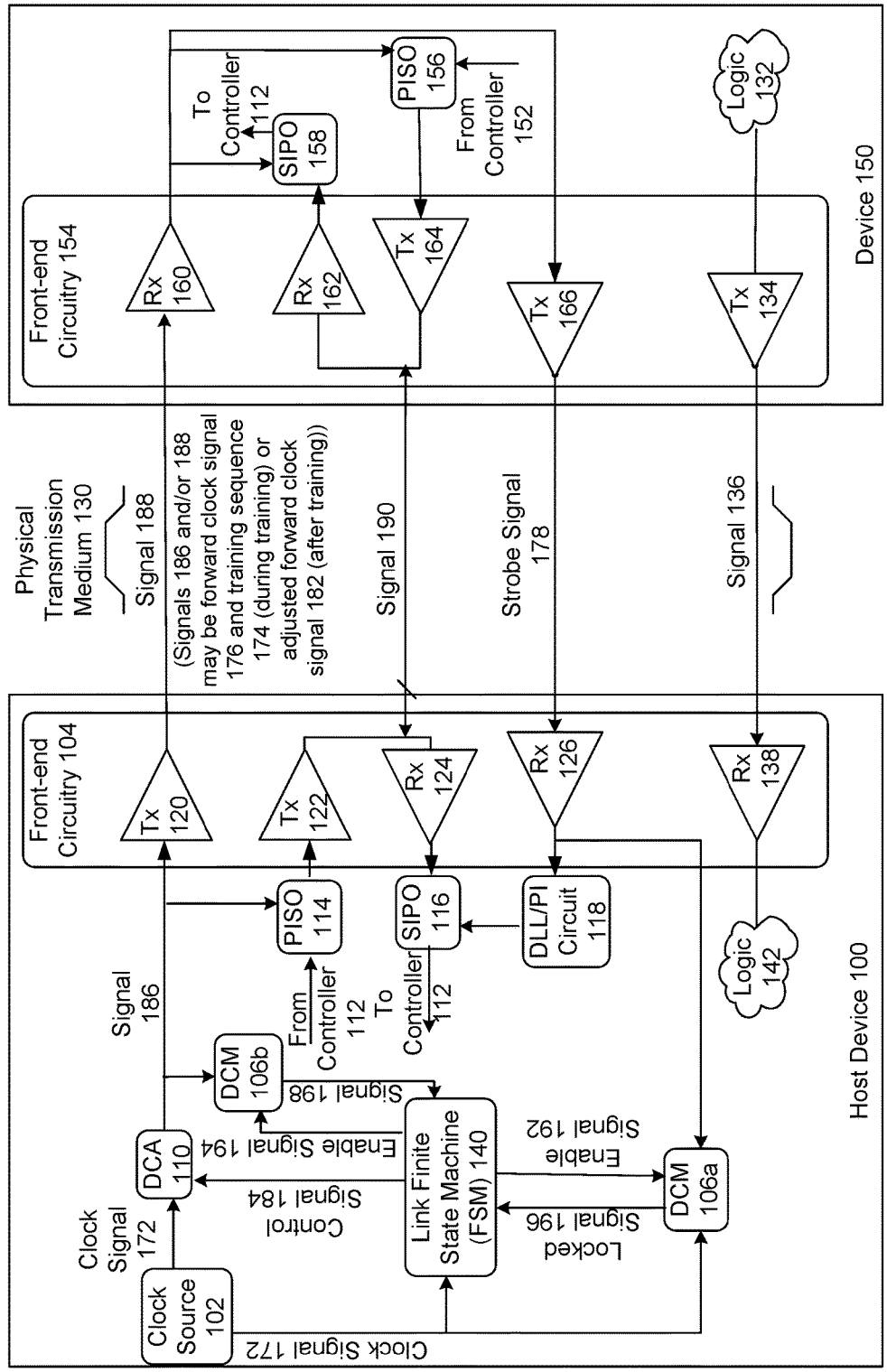
FIG. 1B illustrates a host device and a device in an interconnect architecture with a link finite state machine (FSM), according to one embodiment.

FIG. 1B illustrates a host device 100 and a device 150 in an interconnect architecture with link finite state machine (FSM) 140, according to one embodiment. Components of FIG. 1B may have the same functionality as the components with the same reference number in FIG. 1A.

The link training logic 108 of FIG. 1A may be include link FSM 140. Link FSM 140 is coupled to the DCM 106, the DCA 110, and clock source 102. In one embodiment, DCM 106 includes DCM 106a and DCM 106b. In one embodiment, DCM 106 includes DCM 106a, but not DCM 106b. In one embodiment, functionality of DCM 106a and DCM 106b are included in one DCM 106.

In one embodiment, the DCM 106 includes the link FSM 140. In one embodiment, the DCA 110 includes the link FSM 140. In one embodiment, the link FSM 140 is separate from the DCM 106 and the DCA 110.

The link FSM 140 may send an enable signal 192 to DCM 106a to enable DCM 106a. The link FSM 140 may send an enable signal 194 to DCM 106b to enable DCM 106b. DCM 106a may send a locked signal 196 (e.g., signal 180) to the link FSM 140. DCM 106b may send a signal 198 (e.g., forward clock signal 176) to the link FSM 140.

Logic 132 of device 150 may transmit signal 136 via front-end circuitry 154 (e.g., Tx 134) to the logic 142 of host device 100 via the front-end circuitry 104 (e.g., Rx 138). Signal 190 may be a first command (e.g., "command in," "parallel data lanes from 8 to 16 lanes max," etc.) transmitted from the host device 100 to the device 150. Signal 136 may be a second command (e.g., "command out") transmitted from the device 150 to the host device 100. The second command may correspond to the first command.

The link FSM 140 may have the same functionalities as described with relation to link training logic 108 of FIG. 1A. The link FSM 140 may determine an adjustment to the clock signal 172 to correct the forward clock signal 176 to obtain an adjusted forward clock signal 182 for communications between the host device 100 and the device 150 after the training period. The link FSM 140 may generate a control signal 184 in view of the adjustment to correct the forward clock signal 176. In one embodiment, the link FSM 140 is to determine the adjustment to the clock signal 172 includes determining that a difference between the first duty cycle and the second duty cycle is not within an accuracy limit and determining the adjustment to the clock signal 172 to correct the difference to be within the accuracy limit. In one embodiment, the link FSM 140 is to determine the adjustment to the clock signal 172 includes determining that a duty cycle distortion (DCD) of the forward clock signal 176 is not within a threshold range and determining the adjustment to the clock signal 172 to correct the DCD of the forward clock signal 176 to be within the threshold range.

The link FSM 140 may send a first command code to the device 150 to indicate commencement of the training period. The link FSM 140 may enable one or more of the DCA 110, the DCM 106, and the front-end circuitry 104 (e.g., Rx 126). The link FSM 140 may initiate transmitting, by the front-end circuitry 104 (e.g., Tx 120), the training sequence 174. The link FSM 140 may receive, from the DCM 106, a lock indication (e.g., locked signal 196) that at least one of the first duty cycle has been adjusted within a defined range or the forward clock signal 176 has reached a maximum accuracy limit. The link FSM 140 may lock adjustment of the forward clock signal 176 in view of the lock indication. The link FSM 140 may transmit a second command code to the device 150 to indicate the training period is complete and to proceed to normal boot flow of functional data signaling (e.g., in the case of training carried out in the background in boot flow, flow can proceed to normal functional flow).

Figure 2:
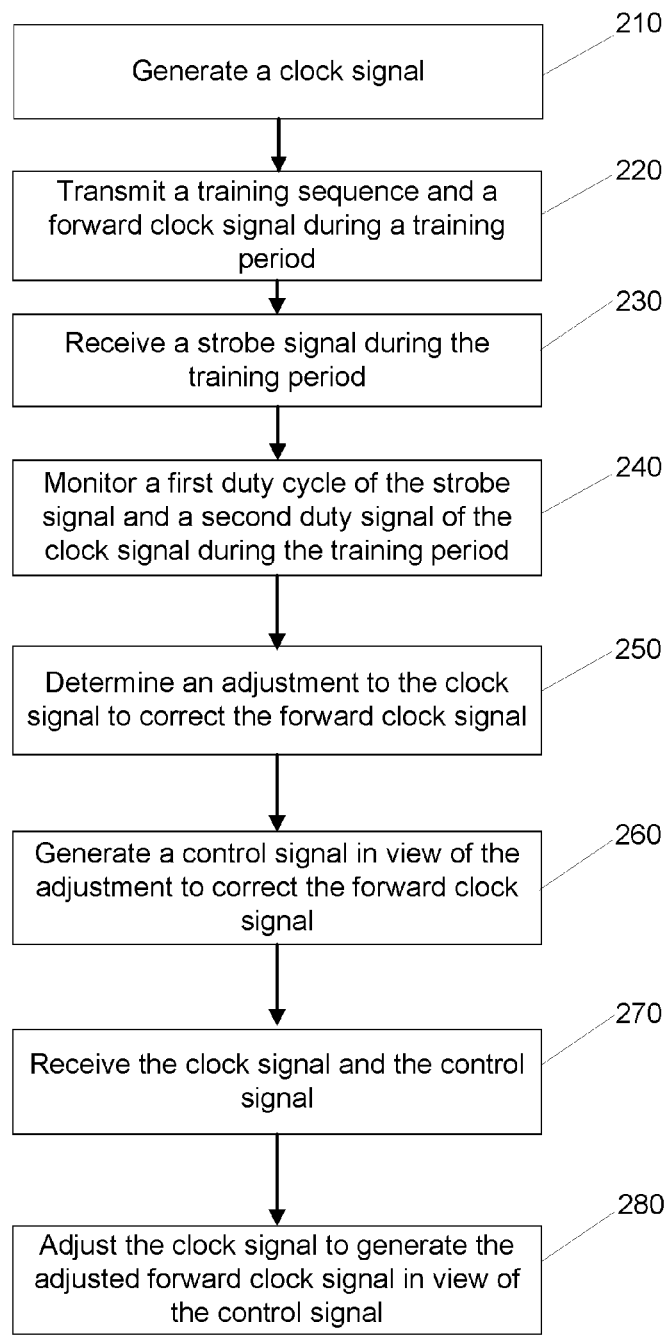
FIG. 2 is a flow diagram of a method of link training between the host device and the device, according to one embodiment.

FIG. 2 is a flow diagram of a method 200 of link training between the host device 100 and the device 150 according to one embodiment. Method 200 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 200 may be performed, in part, by a host device 100, a link training logic 108, or link FSM 140 described above with respect to FIGS. 1A-1B.

For simplicity of explanation, the method 200 is depicted and described as a series of acts. However, acts in accordance with this disclosure can occur in various orders and/or concurrently and with other acts not presented and described herein. Furthermore, not all illustrated acts may be performed to implement the method 200 in accordance with the disclosed subject matter. In addition, those skilled in the art will understand and appreciate that the method 200 could alternatively be represented as a series of interrelated states via a state diagram or events.

Referring to FIG. 2, at 210 the processing logic generates (e.g., via clock source 102 of a host device 100), a clock signal 172.

At block 220, the processing logic transmits (e.g., via front-end circuitry 104 of the host device 100 coupled to the clock source 102 to a device 150 over a physical transmission medium 130) a training sequence 174 and a forward clock signal 176 (e.g., derived from the clock signal 172) during a training period.

At block 230, the processing logic receives (e.g., via the front-end circuitry 104 from the device 150 over the physical transmission medium 130) a strobe signal 178 during the training period.

At block 240, the processing logic monitors (e.g., via a DCM 106 of the host device 100 coupled to the clock source 102 and the front-end circuitry 104) a first duty cycle of the strobe signal 178 and a second duty cycle of the clock signal 172 during the training period.

At block 250, the processing logic determines (e.g., via link training logic 108 of the host device coupled to the DCM 106, via the link FSM 140) an adjustment to the clock signal 172 to correct the forward clock signal 176 to obtain an adjusted forward clock signal 182 for communications between the host device 100 and the device 150 after the training period. In one embodiment, block 250 includes the processing logic determining that a difference between the first duty cycle and the second duty cycle is not within an accuracy limit and the processing logic determining the adjustment to the clock signal 172 to correct the difference to be within the accuracy limit. In one embodiment, block 250 includes the processing logic determining that a duty cycle distortion (DCD) of the forward clock signal 176 is not within a threshold range and the processing logic determining the adjustment to the clock signal 172 to correct the DCD of the forward clock signal 176 to be within the threshold range.

At block 260, the processing logic generates (e.g., via the link training logic 108, via the link FSM 140) a control signal 184 in view of the adjustment to correct the forward clock signal 176.

At block 270, the processing logic receives (e.g., via a DCA 110 of the host device 100 coupled between the clock source 102 and the front-end circuitry 104 and coupled to the DCM 106) the clock signal 172 from the clock source 102 and the control signal 184 from the DCM 184.

At block 280, the processing logic adjusts (e.g., via the DCA 110) the clock signal 172 to generate the adjusted forward clock signal 182 in view of the control signal 184. In one embodiment, block 280 includes processing logic shifting (e.g., via a rising-edge delay circuit of the DCA 110 coupled to the clock source 102 and the link training logic 108, via a rising-edge delay circuit of the DCA 110 coupled to the clock source 102 and the link FSM 140) a rising edge of the clock signal 172 to generate the adjusted forward clock signal 182. In one embodiment, block 280 includes processing logic shifting (e.g., via a falling-edge delay circuit of the DCA 110 coupled to the clock source 102 and the link training logic 108, via a falling-edge delay circuit of the DCA 110 coupled to the clock source 102 and the link FSM 140) a falling edge of the clock signal 172 to generate the adjusted forward clock signal 182. In one embodiment, block 280 includes the processing logic combining (e.g., via an edge combiner circuit of the DCA 110, the edge combiner circuit being coupled to rising-edge delay circuit and the falling-edge delay circuit) a first adjusted forward clock signal (e.g., shifted by the rising-edge delay circuit) and a second adjusted forward clock signal (e.g., shifted by the falling-edge delay circuit) to generate the adjusted forward clock signal 182.

In one embodiment, the method 200 includes processing logic sending (e.g., via a link FSM 140 of the link training logic 108, via a link FSM, via the link training logic 108) a first command code to the device 150 to indicate commencement of the training period. In one embodiment, the method 200 includes processing logic enabling (e.g., via the link FSM 140, via the link training logic 108) one or more of the DCA 110, the DCM 106, and the front-end circuitry 104 (e.g., Rx 126). In one embodiment, the method 200 includes processing logic initiating (e.g., via the link FSM 140, via the link training logic 108) transmitting (e.g., by the front-end circuitry 104 (e.g., Tx 120)) the training sequence 174. In one embodiment, the method 200 includes processing logic receiving (e.g., via the link FSM 140 from the DCM 106, via the link training logic 108 from the DCM 106, a lock indication that at least one of the first duty cycle has been adjusted within a defined range or the forward clock signal 176 has reached a maximum accuracy limit. In one embodiment, the method 200 includes processing logic locking (e.g., via the link FSM 140, via the link training logic 108) adjustment of the forward clock signal 176 in view of the lock indication. In one embodiment, the method 200 includes processing logic transmitting (e.g., via the link FSM 140 to the device 150, via the link training logic 108 to the device 150) a second command code to indicate the training period is complete and to proceed to normal boot flow.

Figure 3:
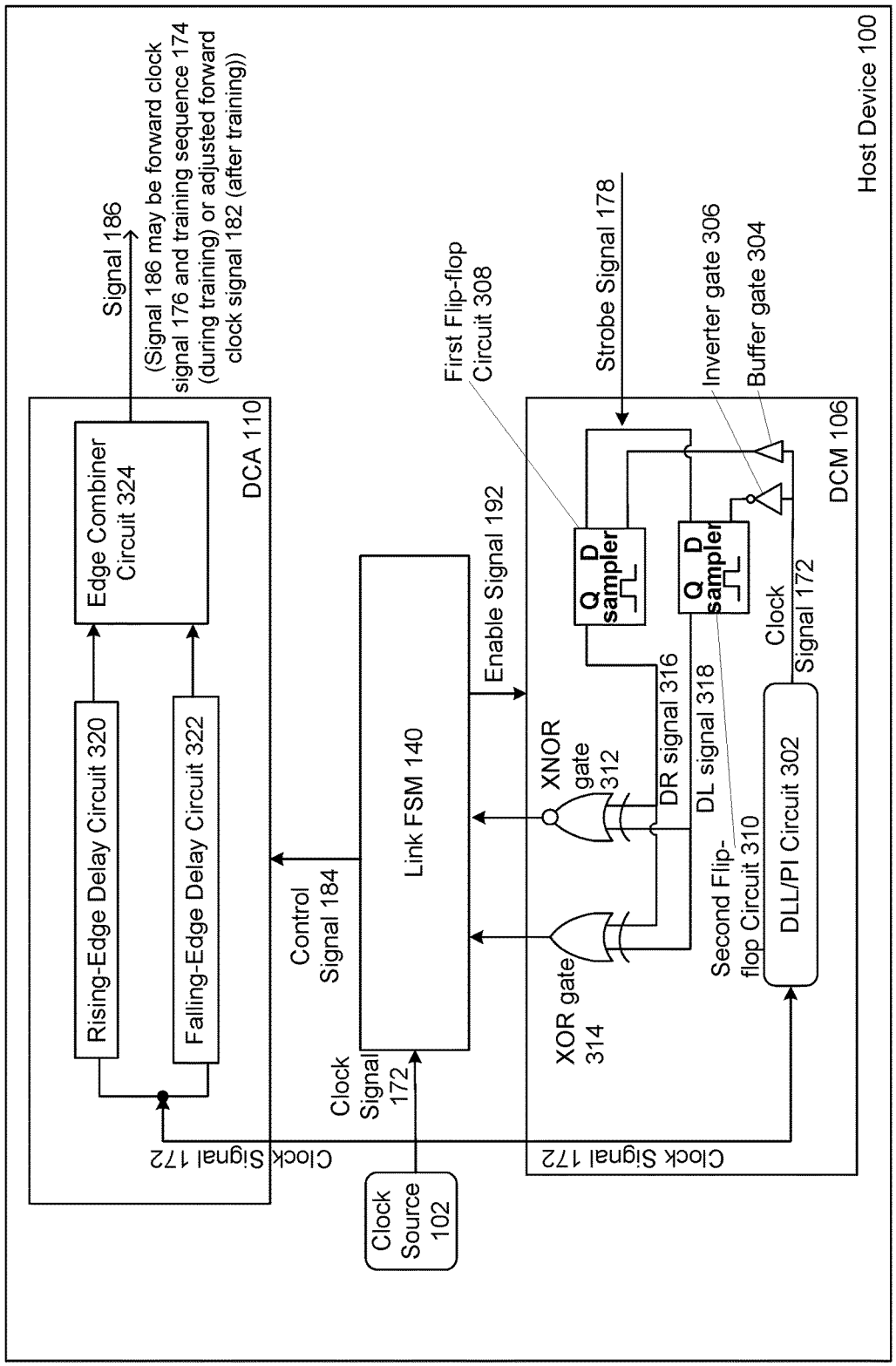
FIG. 3 illustrates the link FSM, duty cycle adjustor (DCA), and duty cycle monitor (DCM) of the host device, according to one embodiment.

FIG. 3 illustrates the link FSM 140 (e.g., link training logic 108), the DCA 110, and the DCM 106 (e.g., DCM 106a, DCM 106b, DCM 106 with functionality of both DCM 106a and DCM 106b, etc.) of the host device 100, according to one embodiment.

A clock source 102 may be coupled with the DCA 110, the link FSM 140, and the DCM 106. The clock source 102 may transmit the clock signal 172 to the DCA 110, the link FSM 140, and the DCM 106.

The DCM 106 may include one or more of a DLL/PI circuit 302 (e.g., same as DLL/PI circuit 118, different from DLL/PI circuit 118, located inside DCM 106, located outside of DCM 106), a buffer gate 304, an inverter gate 306, a first flip-flop circuit 308, a second flip-flop circuit 310, an XNOR gate 312, or an XOR gate 314. First flip-flop circuit 308 may be one or more of a first sampling circuit, a first latch (e.g., StrongARM™ latch), a first flip-flop circuit, or a first clock-based receiver circuit. Second flip-flop circuit 310 may be one or more of a second sampling circuit, a second latch (e.g., StrongARM™ latch), a second flip-flop circuit, or a second clock-based receiver circuit.

The DLL/PI circuit 302 may receive the forward clock signal 176 and generate a second signal. The buffer gate 304 may receive the second signal from the DLL/PI circuit 302 and generate a third signal. The inverter gate 306 may receive the second signal from the DLL/PI circuit 302 and may generate a fourth signal. The first flip-flop circuit 308 may receive the third signal from the buffer gate 304 and the strobe signal 178 from the device 150. The first flip-flop circuit 308 may output a DR signal 316 (e.g., sample right (SR) signal, sampler SR, etc.). The second flip-flop circuit 310 may receive the fourth signal from the inverter gate 306 and the strobe signal 178 from the device 150. The second flip-flop circuit 310 may output a DL signal 318 (e.g., sample left (SL) signal, sampler DL, etc.). The XNOR gate 312 may receive the DR signal 316 from the first flip-flop circuit 308 and the DL signal 318 from the second flip-flop circuit 310 and may generate a fifth signal to transmit to the link FSM 140. The XOR gate 314 may receive the DR signal 316 from the first flip-flop circuit 308 and the DL signal 318 from the second flip-flop circuit 310 and may generate a sixth signal to transmit to the link FSM 140. The link FSM 140 may use the clock signal 172 in view of the fifth signal and the sixth signal (e.g., in view of the DR signal 316 and the DL signal 318) to generate a control signal 184 to cause signal 186 (e.g., forward clock signal and training sequence 174, adjusted forward clock signal 182, etc.) to be generated.

The DCM 106 may be a digital circuit that is to monitor the duty cycle of the received strobe signal 178 and from the forward clock signal 176 using 0 and 180 clock phases generated from PLL or DLL through clock signal 172 and the output of DCM 106 (e.g., DR signal 316, DL signal 318) sent to link FSM 140 and the link FSM 140 decides whether duty correction of the strobe signal 178 is completed or not. The link FSM 140 is to monitor and determine whether the corrected clock code (e.g., adjusted forward clock signal 182) is within a maximum accuracy limit.

The DCA 110 receives clock signal 172 and outputs signal 186. The DCA 110 is used to smoothly shift the falling edge of signal 186 (e.g., transmitting strobe) upon indication (e.g., control signal 184) from link FSM 140 based on the outcome of the DCM 106. Rising and falling edges are combined via edge combiner sub block 324. Link FSM 140 is responsible for controlling the edge combining until the time strobe signal duty cycle is corrected.

The DCA 110 may include a rising-edge delay circuit 320, a falling-edge delay circuit 322, and an edge combiner circuit 324. The rising-edge delay circuit 320 is coupled to the clock source 102 and the link FSM 140 or link training logic 108. The rising-edge delay circuit 320 may include a chain of inverters and/or buffers to shift or make a rising edge. The falling-edge delay circuit 322 is coupled to the clock source 102 and the link FSM 140 or link training logic 108. The falling-edge delay circuit 322 may include a chain of inverters and/or buffers to shift or make a falling edge. The DCA 110 may adjust the clock signal 172 to generate the adjusted forward clock signal 182 in view of the control signal 184 by at least one of shifting, via the rising-edge delay circuit 320, the rising edge of the clock signal 172 or shifting, via the falling-edge delay circuit 322, the falling edge of the clock signal 172 to generate the adjusted forward clock signal 182. The edge combiner circuit 324 is coupled to the rising-edge delay circuit 320 and the falling-edge delay circuit 322 to combine a first adjusted forward clock signal, shifted by the rising-edge delay circuit 320, and a second adjusted forward clock signal, shifted by the falling-edge delay circuit 322, to generate the adjusted forward clock signal 182 (e.g., signal 186).

The link FSM 140 initiates the training period. The link FSM 140 starts by sending a command code to device 150 to indicate that the training period has started, enabling host receiver (e.g., Rx 138), and initiating sending the stress pattern (e.g., training sequence 174). After receiving data from device 150, link FSM 140 enables DCM 106 to monitor the duty cycle of the strobe signal 178 and to also monitor the duty cycle of the clock signal 172. Link FSM 140 starts adjusting the forward clock signal 176 using the DCA 110, monitors for a locked signal 196 from DCM 106, and monitors the duty cycle of the forward clock signal 176 to determine that the forward clock signal 176 remains within the maximum accuracy limit. After receiving the locked signal 196 and determining the forward clock signal 176 is within the accuracy limit, link FSM 140 locks the code and sends a command code to device 150 to indicate the training period (e.g., link training) is complete and to proceed for normal boot flow.

The host device 100 may quickly estimate with coarse and/or fine granularity the code required to adjust the DCD of the strobe signal 178. The training period starts by sending a command code to indicate to the device 150 that the training period has started. The training period will stop once the DCM 106 gives an indication that the duty cycle of the strobe signal 178 is adjusted within the defined specification and will also stop if the forward clock signal reaches a maximum accuracy limit. The link FSM 140 sends a common code to the edge combiner circuit 324 to indicate that the training has completed.

Figure 4:
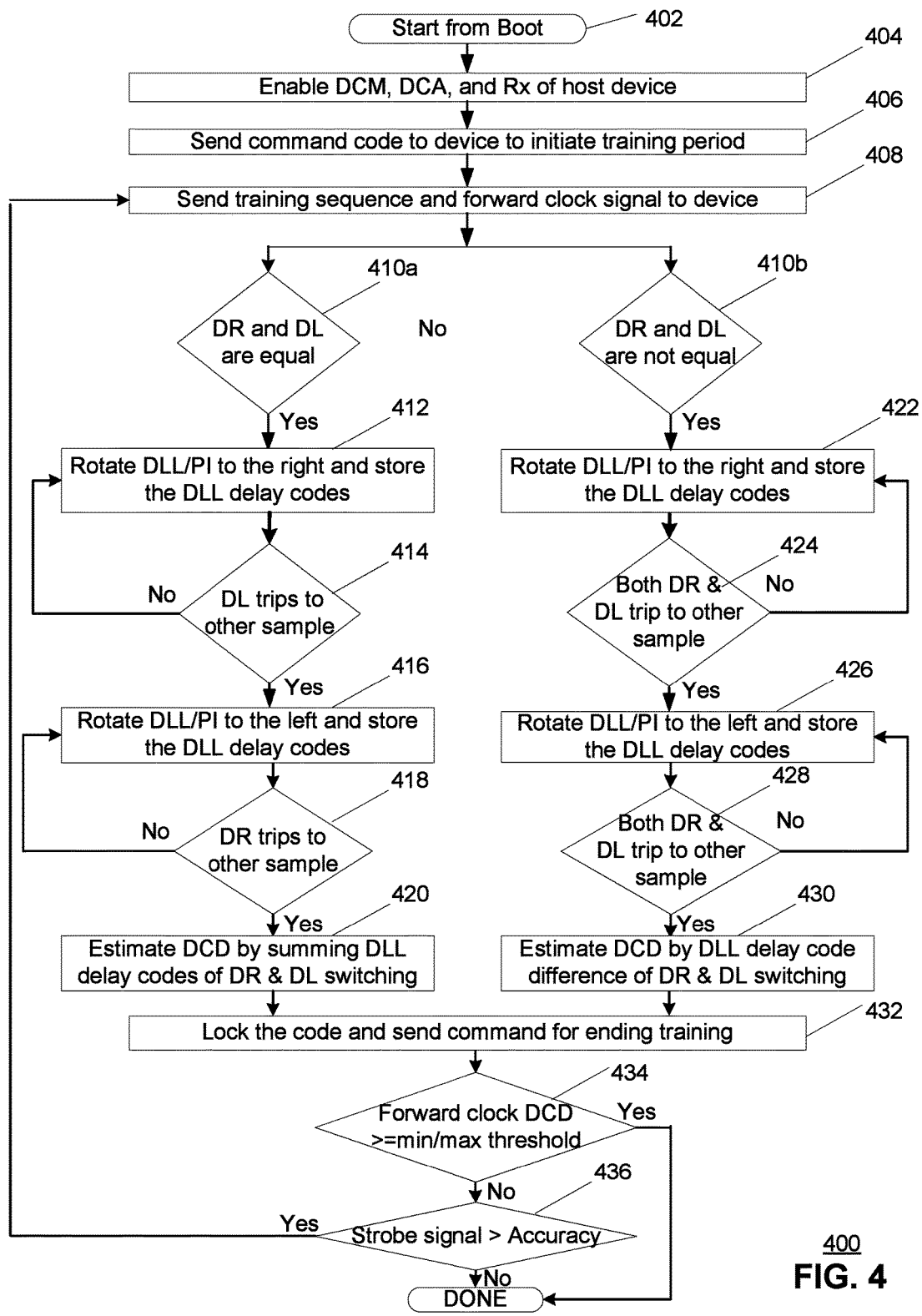
FIG. 4 is a flow diagram of a method of link training between the host device and the device, according to one embodiment.

FIG. 4 is a flow diagram of a method 400 of link training between the host device 100 and the device 150 according to one embodiment. Method 400 may be performed by processing logic that may include hardware (e.g., circuitry, dedicated logic, programmable logic, microcode, etc.), software (such as instructions run on a processor, a general purpose computer system, or a dedicated machine), firmware, microcode, or a combination thereof. In one embodiment, method 400 may be performed, in part, by a host device 100, a link training logic 108, or link FSM 140 described above with respect to FIGS. 1A-1B.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at 402 the processing logic starts from boot.

At block 404, the processing logic enables DCM 106, DCA 110, and Rx 126 of host device 100. The processing logic may enable calibration (e.g., enable DCM 106, DCA 110, and Rx 126) if device 150 is connected.

At block 406, the processing logic sends a command code to device 150 to initiate the training period (e.g., enable link training).

At block 408, the processing logic sends a training sequence 174 (e.g., stress pattern) and a forward clock signal 176 to the device 150.

At blocks 410a and 410b, the processing logic receives strobe signal 178 and determines if DR signal 316 and DL signal 318 are equal. If DR signal 316 and DL signal 318 are equal (e.g., block 410a), flow continues to block 412. If DR signal 316 and DL signal 318 are not equal (e.g., block 410b), flow continues to block 422.

At block 412, the processing logic rotates the DLL/PI circuit 302 to the right and stores the DLL delay codes.

At block 414, the processing logic determines if DL signal 318 trips to another sample. If DL signal 318 does not trip to another sample, flow continues to block 412. If DL signal 318 does trip to another sample, flow continues to block 416.

At block 416, the processing logic rotates the DLL/PI circuit 302 to the left and stores the DLL delay codes.

At block 418, the processing logic determines if DR signal 316 trips to another sample. If DR signal 316 does not trip to another sample, flow continues to block 416. If DR signal 316 does trip to another sample, flow continues to block 420.

At block 420, the processing logic estimates duty cycle distortion (DCD) (e.g., of the strobe signal 178, etc.) by summing the DLL delay codes of DR signal 316 and DL signal 318 switching. The delay codes may be used (e.g., with or without the delay codes from block 430) to generate one or more of the control signal 184, the adjusted forward clock signal 182, or the locked signal 196.

At block 422, the processing logic rotates the DLL/PI circuit 302 to the right and stores the DLL delay codes.

At block 424, the processing logic determines if both DL signal 318 and DR signal 316 trip to another sample. If both DL signal 318 and DR signal 316 do not trip to another sample, flow continues to block 422. If both DL signal 318 and DR signal 316 do trip to another sample, flow continues to block 426.

At block 426, the processing logic rotates the DLL/PI circuit 302 to the left and stores the DLL delay codes of DL signal 318 and DR signal 316.

At block 428, the processing logic determines if both DL signal 318 and DR signal 316 trip to another sample. If both DL signal 318 and DR signal 316 do not trip to another sample, flow continues to block 426. If both DL signal 318 and DR signal 316 do trip to another sample, flow continues to block 430.

At block 430, the processing logic estimates DCD (e.g., of the strobe signal 178, etc.) by the DLL delay code difference of DR signal 316 and DL signal 318 switching. The delay codes may be used (e.g., with or without the delay codes from block 420) to generate one or more of the control signal 184, the adjusted forward clock signal 182, or the locked signal 196.

At block 432, the processing logic locks the adjusted forward clock signal 182 (e.g., locks the code) and sends a command to device 150 to end the training period.

At block 434, the processing logic determines if the DCD of the forward clock signal 176 (e.g., adjusted forward clock signal 182) is greater than or equal to minimum/maximum thresholds. If the DCD is greater than or equal to the minimum/maximum thresholds, method 400 ends. If the DCD is not greater than or equal to the minimum/maximum thresholds, flow continues to block 436.

At block 436, the processing logic determines if a difference between the duty cycle of the strobe signal 178 and the duty cycle of the forward clock signal 176 is greater than a minimum accuracy threshold. If the difference is not greater, method 400 ends. If the difference is greater, flow continues to block 408.

FIG. 5A illustrates a strobe signal 178 with an even, centered duty cycle, according to one embodiment. The unit intervals (UIs) (e.g., a unit interval is half of a cycle) of the duty cycle of the strobe signal 178 are equal (e.g., good duty, 50-50 DCD) and the DL signal 318 and the DR signal 316 are centered on different UIs. Upon receiving a strobe signal 178 as shown in FIG. 5A, DCM 106 may send a locked signal 196 to link FSM 140 in response to the strobe signal 178 having an even, centered duty cycle that matches the clock signal (CK) 502A (e.g., clock signal 172, same as clock signals 502B-D) and inverted clock signal (CKB) 504A (e.g., same as inverted clock signals 504B-D).

FIG. 5B illustrates a strobe signal 178 with an even, non-centered duty cycle, according to one embodiment. The UIs of the duty cycle of the strobe signal 178 are equal (e.g., good duty), but the DL signal 318 and the DR signal 316 are not centered on their respective UIs. Upon receiving a strobe signal 178 as shown in FIG. 5B, link FSM 140 may send a control signal 184 to DCA 110 to adjust the forward clock signal 176 to be centered in response to the strobe signal 178 not being centered with the CK 502B (e.g., same as clock signal 172, same as CK 502A, etc.) and CKB 504B (e.g., same as CKB 504A). The DLL/PI circuit 302 may be used to sample the strobe signal 178 at UI center.

FIG. 5C illustrates a strobe signal 178 with an uneven duty cycle in different unit intervals (UI), according to one embodiment. The unit intervals (UIs) of the duty cycle of the strobe signal 178 are uneven (e.g., bad duty, different sized unit intervals (e.g., 30-70 DCD), rising sampling edge has a bad margin). The DL signal 318 and the DR signal 316 are on different UIs. Upon receiving a strobe signal 178 as shown in FIG. 5C, link FSM 140 may send a control signal 184 to DCA 110 to adjust the duty cycle of forward clock signal 176 in response to the strobe signal 178 having an uneven duty cycle that does not match the CK 502C (e.g., same as clock signal 172, same as CK 502A, etc.) and CKB 504C (e.g., same as CKB 504A). The DLL/PI circuit 302 may be used to sample the strobe signal 178 at UI center and the DCD may be corrected.

FIG. 5D illustrates a strobe signal 178 with an uneven duty cycle in the same UI, according to one embodiment. The unit intervals (UIs) of the duty cycle of the strobe signal 178 are uneven (e.g., bad duty, different sized unit intervals). The DL signal 318 and the DR signal 316 are on the same UI. Upon receiving a strobe signal 178 as shown in FIG. 5D, link FSM 140 may send a control signal 172 to DCA 110 to adjust the duty cycle of the forward clock signal 176 and to adjust the forward clock signal 176 to be centered in response to the strobe signal 178 having an uneven duty cycle that does not match the CK 502D (e.g., same as clock signal 172, same as CK 502A, etc.) and CKB 504D (e.g., same as CKB 504A). The DLL/PI circuit 302 may be used to sample the strobe signal 178 at UI center and the DCD may be corrected.

Figure 6:
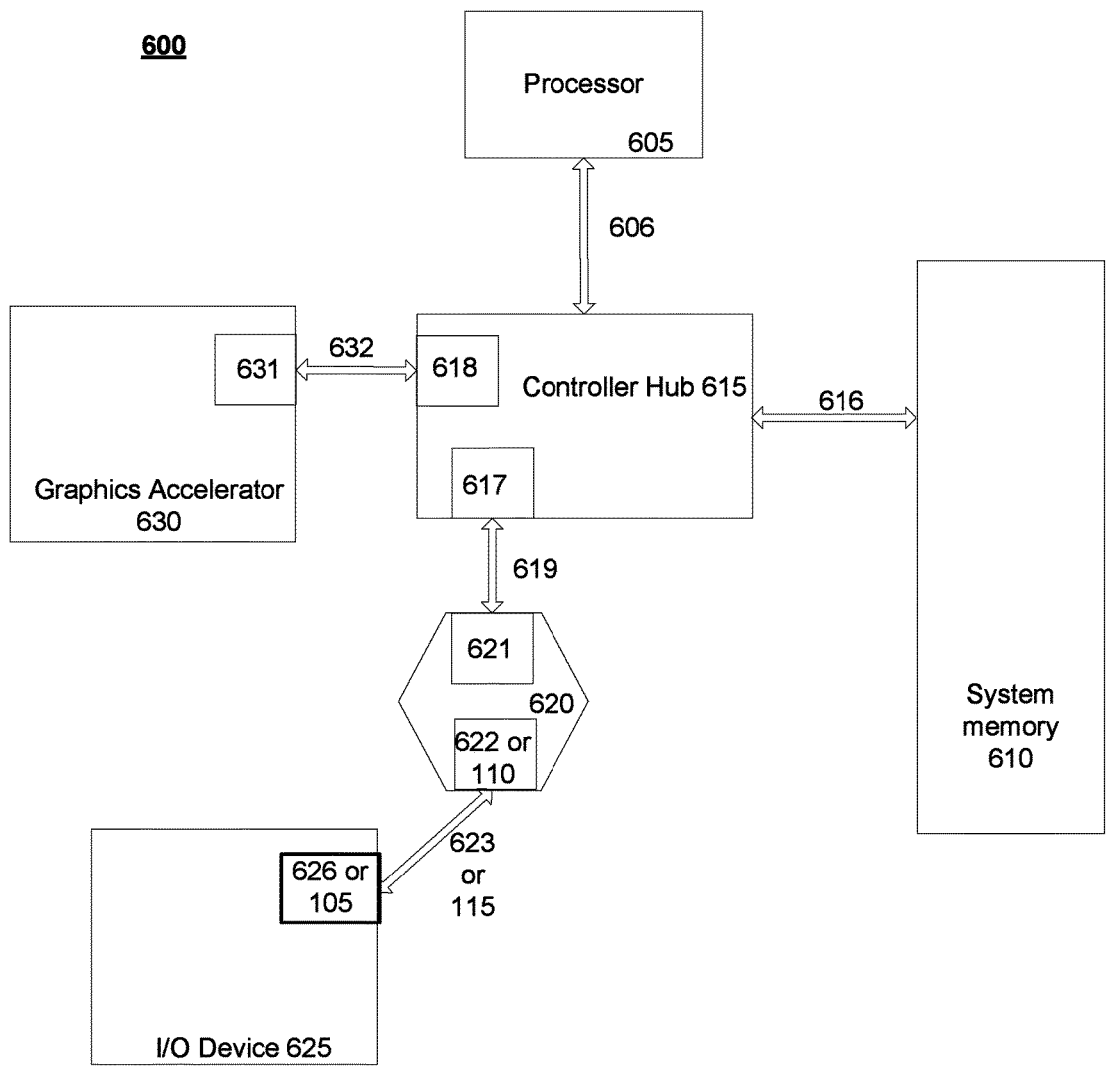
FIG. 6 illustrates a computing system with multiple interconnects with link training logic, according to one embodiment.

FIG. 6 illustrates a computer system 600 with multiple interconnects with link training logic 108 (e.g., link FSM 140), according to one embodiment. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect as described below. In another embodiment, FSB 606 (e.g., link) includes a serial, differential interconnect architecture that is compliant with different interconnect standards.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller. Examples of controller hub 615 include a chipset, a memory controller hub (MCH), a north bridge, an interconnect controller hub (ICH) a south bridge, and a root controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex (e.g., controller 615).

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e. up a hierarchy towards a root complex, to controller hub 615 and downstream, i.e. down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Fire wire device, a Universal Serial Bus (USB) device, a scanner, and other input/output devices. Often in the PCIe® vernacular, such as device, is referred to as an endpoint. Although not specifically shown, device 625 may include a PCIe® to PCI/PCI-X bridge to support legacy or other version PCI devices. Endpoint devices in PCIe® are often classified as legacy, PCIe®, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. Similar to the MCH discussion above, a graphics controller or the graphics accelerator 630 itself may be integrated in processor 605.

I/O device 625 includes an interface 626 and switch/bridge 620 includes an interface 622. Interface 626 is coupled to interface 622 via serial link 623. Switch/bridge 620 may be higher in hierarchy than I/O device 625 and switch/bridge 620 may have access (directly or indirectly) to master information (e.g., clock source 102). I/O device 625 may not have a clock source 102. Interface 626 or I/O device 625 may include device 150. Switch/bridge 620 or interface 622 may include host device 100. Controller hub 615 or interface 617 may include host device 100. Interface 621 on switch 620 may include a device 150. I/O device may receive a timing sequence 174 and forward clock signal 176 and transmit strobe signal 178, via interface 626, to switch/bridge 620 which receives the strobe signal 178 via interface 622. Switch/bridge 620 sends, via interface 622, an adjusted forward clock signal 182 in response to the strobe signal 178 via serial link 623 to I/O device 625.

In one embodiment, short range wireless engines including a WLAN unit and a Bluetooth® unit may couple to processor 605 via an interconnect according to a PCIe® protocol, e.g., in accordance with the PCI Express® Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard. Using WLAN unit, Wi-Fi® communications in accordance with a given Institute of Electrical and Electronics Engineers (IEEE) 802.11 standard can be realized, while via a unit using the Bluetooth® technology, short range communications via a Bluetooth® protocol can occur. In another embodiment, these units may communicate with processor 605 via, e.g., a USB link or a universal asynchronous receiver transmitter (UART) link.

Figure 7:
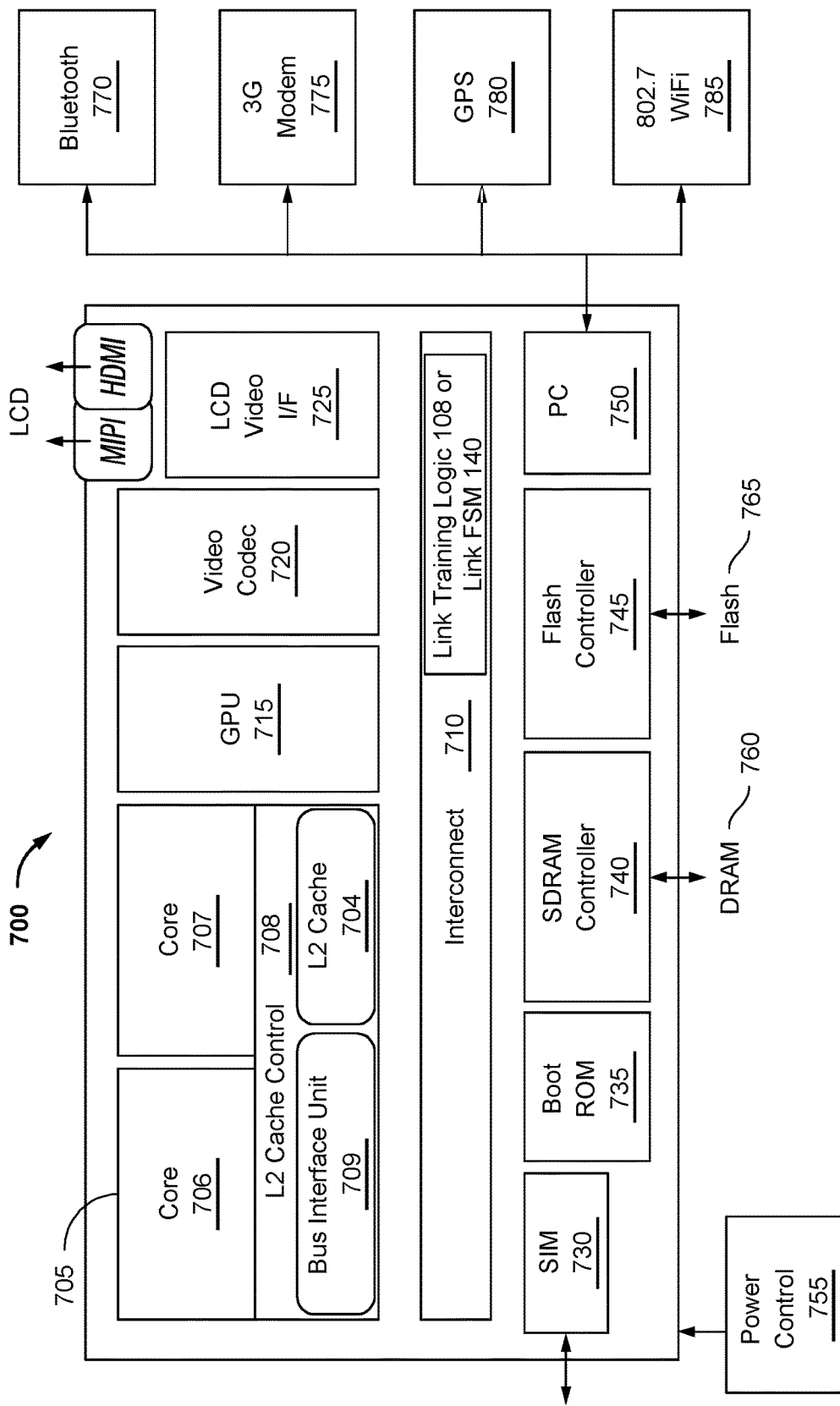
FIG. 7 illustrates a system on a chip (SOC) design, according to one embodiment.

Turning next to FIG. 7, an embodiment of a system on-chip (SOC) design in accordance with the disclosures is depicted. As a specific illustrative example, SOC 700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 700 includes 2 cores-706 and 707. Similar to the discussion above, cores 706 and 707 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 704 to communicate with other parts of system 700. Interconnect 710 includes an on-chip interconnect, such as an IOSF, AMBA, or other interconnect discussed above, which potentially implements one or more aspects of the described disclosure. In one embodiment, interconnect 710 includes link training logic 108. In another embodiment, interconnect 710 includes link FSM 140.

Interface 710 provides communication channels to the other components, such as a Subscriber Identity Module (SIM) 730 to interface with a SIM card, a boot room 735 to hold boot code for execution by cores 706 and 707 to initialize and boot SOC 700, a SDRAM controller 740 to interface with external memory (e.g. DRAM 760), a flash controller 745 to interface with non-volatile memory (e.g. Flash 765), a peripheral control Q1650 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the disclosure described herein.

Interconnect 710 may connect with another component via a physical transmission medium 130 (e.g., on-chip interconnect, IOSF, AMBA, or other interconnect). The link training logic 108 or link FSM 140 may initiate a training period with the other component via physical transmission medium 130 to generate an adjusted forward clock signal 182 for transmission after the training period.

In addition, the system illustrates peripherals for communication, such as a Bluetooth® module 770, 3G modem 775, GPS 785, and Wi-Fi® 785. Note as stated above, a UE includes a radio for communication. As a result, these peripheral communication modules are not all required. However, in a UE some form a radio for external communication is to be included.

Figure 8:
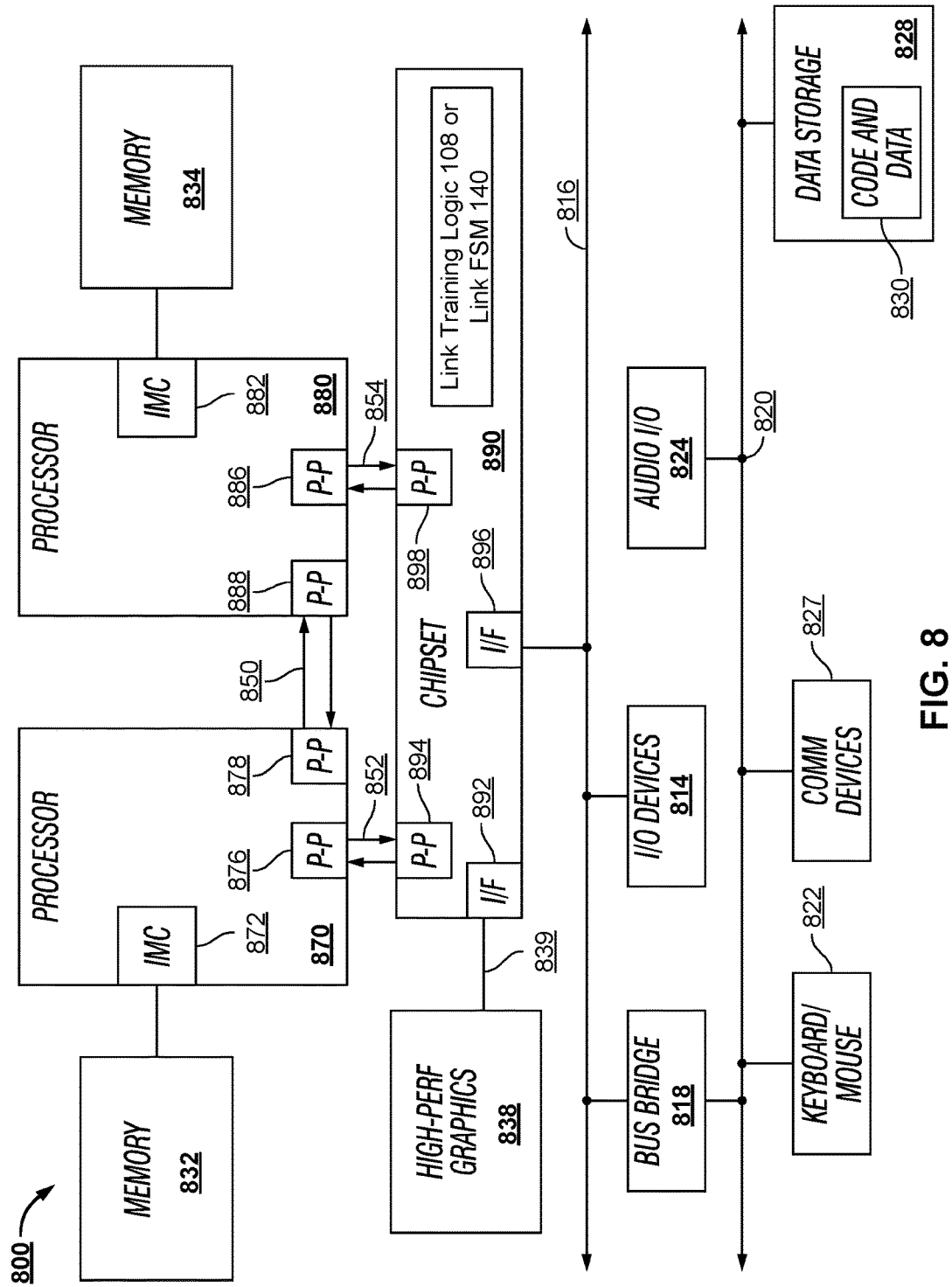
FIG. 8 illustrates a block diagram for a computing system, according to one embodiment.

Referring now to FIG. 8, shown is a block diagram of a system 800 in accordance with an embodiment of the disclosure. As shown in FIG. 8, multiprocessor system 800 is a point-to-point interconnect system, and includes a first processor 870 and a second processor 880 coupled via a point-to-point interconnect 850. Each of processors 870 and 880 may be some version of a processor. In one embodiment, 852 and 854 are part of a serial, point-to-point coherent interconnect fabric, such as Intel® Quick Path Interconnect (QPI) architecture. As a result, the disclosure may be implemented within the QPI architecture.

While shown with only two processors 870, 880, it is to be understood that the scope of the present disclosure is not so limited. In other embodiments, one or more additional processors may be present in a given processor.

Processors 870 and 880 are shown including integrated memory controller units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 each exchange information with a chipset 890 via individual P-P interfaces 852, 854 using point to point interface circuits 876, 894, 886, 898. Chipset 890 also exchanges information with a high-performance graphics circuit 838 via an interface circuit 892 along a high-performance graphics interconnect 839. In one embodiment, chipset 890 includes link training logic 108. In another embodiment, chipset 890 includes link FSM 140.

Chipset 890 may connect with another component via a physical transmission medium 130 (e.g., P-P interface 852, P-P interface 854, high-performance graphics interconnect 839, bus 816, and so forth). The link training logic 108 or link FSM 140 may initiate a training period with the other component via physical transmission medium 130 to generate an adjusted forward clock signal 182 for transmission after the training period.

A shared cache (not shown) may be included in either processor or outside of both processors; yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation I/O interconnect bus, although the scope of the present disclosure is not so limited.

As shown in FIG. 8, various I/O devices 814 are coupled to first bus 816, along with a bus bridge 818 which couples first bus 816 to a second bus 820. In one embodiment, second bus 820 includes a low pin count (LPC) bus. Various devices are coupled to second bus 820 including, for example, a keyboard and/or mouse 822, communication devices 827 and a storage unit 828 such as a disk drive or other mass storage device which often includes instructions/code and data 830, in one embodiment. Further, an audio I/O 824 is shown coupled to second bus 820. Note that other architectures are possible, where the included components and interconnect architectures vary. For example, instead of the point-to-point architecture of FIG. 8, a system may implement a multi-drop bus or other such architecture.

The following examples pertain to further embodiments.

Example 1 is a host device comprising: a clock source to generate a clock signal; front-end circuitry coupled to the clock source, the front-end circuitry to transmit, to a device over a physical transmission media, a training sequence and a forward clock signal derived from the clock signal during a training period and the front-end circuitry to receive a strobe signal from the device over the physical transmission media during the training period; a duty cycle monitor (DCM) coupled to the clock source and the front-end circuitry, the DCM to monitor a first duty cycle of the strobe signal and a second duty cycle of the clock signal during the training period; link training logic coupled to the DCM, the link training logic to determine an adjustment to the clock signal to correct the forward clock signal to obtain an adjusted forward clock signal for communications between the host device and the device after the training period, and the link training logic to generate a control signal in view of the adjustment to correct the forward clock signal; and a duty cycle adjustor (DCA) coupled between the clock source and the front-end circuitry and coupled to the DCM, the DCA to receive the clock signal from the clock source and the control signal from the DCM and the DCA to adjust the clock signal to generate the adjusted forward clock signal in view of the control signal.

In Example 2, the subject matter of Example 1, wherein the link training logic to determine the adjustment to the clock signal comprises: determining that a difference between the first duty cycle and the second duty cycle is not within an accuracy limit; and determining the adjustment to the clock signal to correct the difference to be within the accuracy limit.

In Example 3, the subject matter of any one of Examples 1-2, wherein the link training logic to determine the adjustment to the clock signal comprises: determining that a duty cycle distortion (DCD) of the forward clock signal is not within a threshold range; and determining the adjustment to the clock signal to correct the DCD of the forward clock signal to be within the threshold range.

In Example 4, the subject matter of any one of Examples 1-3, wherein the DCA comprises: a rising-edge delay circuit coupled to the clock source and the link training logic; and a falling-edge delay circuit coupled to the clock source and the link training logic, wherein the DCA to adjust the clock signal to generate the adjusted forward clock signal in view of the control signal comprises at least one of shifting, via the rising-edge delay circuit, the rising edge of the clock signal or shifting, via the falling-edge delay circuit, the falling edge of the clock signal to generate the adjusted forward clock signal.

In Example 5, the subject matter of any one of Examples 1-4, wherein the DCA further comprises an edge combiner circuit coupled to rising-edge delay circuit and the falling-edge delay circuit to combine a first adjusted forward clock signal, shifted by the rising-edge delay circuit, and a second adjusted forward clock signal, shifted by the falling-edge delay circuit, to generate the adjusted forward clock signal.

In Example 6, the subject matter of any one of Examples 1-5, wherein the link training logic comprises a link finite state machine (FSM), the link FSM to: send a first command code to the device to indicate commencement of the training period; enable the DCA, the DCM, and the front-end circuitry; initiate transmitting, by the front-end circuitry, the training sequence; receive, from the DCM, a lock indication that at least one of the first duty cycle has been adjusted within a defined range or the forward clock signal has reached a maximum accuracy limit; lock adjustment of the forward clock signal in view of the lock indication; and transmit a second command code to the device to indicate the training period is complete and to proceed to normal boot flow.

In Example 7, the subject matter of any one of Examples 1-6, wherein the DCM comprises: a delay locked loop/phase interpolator (DLL/PI) circuit to receive the forward clock signal and to generate a second signal; a buffer gate to receive the second signal from the DLL/PI circuit and to generate a third signal; an inverter gate to receive the second signal from the DLL/PI circuit and to generate a fourth signal; a first circuit to receive the third signal from the buffer gate and the strobe signal from the device, the first circuit to output a DR signal, wherein the first circuit is a first sampling circuit, a first latch, a first flip-flop circuit, or a first clock-based receiver circuit; a second circuit to receive the fourth signal from the inverter gate and the strobe signal from the device, the second circuit to output a DL signal, wherein the second circuit is a second sampling circuit, a second latch, a second flip-flop circuit, or a second clock-based receiver circuit; an XNOR gate to receive the DR signal from the first circuit and the DL signal from the second circuit and to generate a fifth signal to transmit to the link training logic; and an XOR gate to receive the DR signal from the first circuit and the DL signal from the second circuit and to generate a sixth signal to transmit to the link training logic, wherein the link training logic to determine the adjustment to the clock signal in view of the DR signal and the DL signal.

In Example 8, the subject matter of any one of Examples 1-7, wherein the host device is to generate the adjusted forward clock signal without receiving an acknowledgement from the device, wherein the host device is to one or more of: generate the adjusted forward clock signal through software; generate the adjusted forward clock signal as part of BIOS during boot time; or generate the adjusted forward clock signal in a functional mode.

Example 9 is a method comprising: generating, via a clock source of a host device, a clock signal; transmitting, via front-end circuitry of the host device coupled to the clock source to a device over a physical transmission media during a training period, a training sequence and a forward clock signal derived from the clock signal; receiving, via the front-end circuitry from the device over the physical transmission media, a strobe signal during the training period; monitoring, via a duty cycle monitor (DCM) of the host device coupled to the clock source and the front-end circuitry, a first duty cycle of the strobe signal and a second duty cycle of the clock signal during the training period; determining, via link training logic of the host device coupled to the DCM, an adjustment to the clock signal to correct the forward clock signal to obtain an adjusted forward clock signal for communications between the host device and the device after the training period; generating, via the link training logic, a control signal in view of the adjustment to correct the forward clock signal; receiving, via a duty cycle adjustor (DCA) of the host device coupled between the clock source and the front-end circuitry and coupled to the DCM, the clock signal from the clock source and the control signal from the DCM; and adjusting, via the DCA, the clock signal to generate the adjusted forward clock signal in view of the control signal.

In Example 10, the subject matter of Example 9, wherein the determining of the adjustment to the clock signal comprises: determining that a difference between the first duty cycle and the second duty cycle is not within an accuracy limit; and determining the adjustment to the clock signal to correct the difference to be within the accuracy limit.

In Example 11, the subject matter of any one of Examples 9-10, wherein the determining of the adjustment to the clock signal comprises: determining that a duty cycle distortion (DCD) of the forward clock signal is not within a threshold range; and determining the adjustment to the clock signal to correct the DCD of the forward clock signal to be within the threshold range.

In Example 12, the subject matter of any one of Examples 9-11, wherein the adjusting of the clock signal to generate the adjusted forward clock signal in view of the control signal comprises at least one of: shifting, via a rising-edge delay circuit of the DCA coupled to the clock source and the link training logic, a rising edge of the clock signal to generate the adjusted forward clock signal; or shifting, via a falling-edge delay circuit of the DCA coupled to the clock source and the link training logic, a falling edge of the clock signal to generate the adjusted forward clock signal.

In Example 13, the subject matter of any one of Examples 9-12, wherein the adjusting of the clock signal to generate the adjusted forward clock signal in view of the control signal comprises combining, via an edge combiner circuit of the DCA, the edge combiner circuit being coupled to rising-edge delay circuit and the falling-edge delay circuit, a first adjusted forward clock signal, shifted by the rising-edge delay circuit, and a second adjusted forward clock signal, shifted by the falling-edge delay circuit, to generate the adjusted forward clock signal.

In Example 14, the subject matter of any one of Examples 9-13 further comprising: sending, via a link finite state machine (FSM) of the link training logic, a first command code to the device to indicate commencement of the training period; enabling, via the link FSM, the DCA, the DCM, and the front-end circuitry; initiating, via the link FSM, transmitting, by the front-end circuitry, the training sequence; receiving, via the link FSM from the DCM, a lock indication that at least one of the first duty cycle has been adjusted within a defined range or the forward clock signal has reached a maximum accuracy limit; locking, via the link FSM, adjustment of the forward clock signal in view of the lock indication; and transmitting, via the link FSM to the device, a second command code to indicate the training period is complete and to proceed to normal boot flow.

In Example 15, the subject matter of any one of Examples 9-14, wherein the adjusting of the clock signal to generate the adjusted forward clock signal is without receiving an acknowledgement from the device, wherein the adjusting of the clock signal to generate the adjusted forward clock signal is one or more of through software, as part of BIOS during boot time, or in a functional mode.

Example 16 is a system comprising: a physical transmission media; a device coupled to the physical transmission media; and a host device coupled to physical transmission media, the host device comprising: a clock source to generate a clock signal; front-end circuitry coupled to the clock source, the front-end circuitry to transmit, to the device over the physical transmission media, a training sequence and a forward clock signal derived from the clock signal during a training period and the front-end circuitry to receive a strobe signal from the device over the physical transmission media during the training period; a duty cycle monitor (DCM) coupled to the clock source and the front-end circuitry, the DCM to monitor a first duty cycle of the strobe signal and a second duty cycle of the clock signal during the training period; a link finite state machine (FSM) coupled to the DCM, the link FSM to determine an adjustment to the clock signal to correct the forward clock signal to obtain an adjusted forward clock signal for communications between the host device and the device after the training period, and the link FSM to generate a control signal in view of the adjustment to correct the forward clock signal; and a duty cycle adjustor (DCA) coupled between the clock source and the front-end circuitry and coupled to the DCM, the DCA to receive the clock signal from the clock source and the control signal from the DCM and the DCA to adjust the clock signal to generate the adjusted forward clock signal in view of the control signal.

In Example 17, the subject matter of Example 16, wherein the link FSM, to determine the adjustment to the clock signal, is further to: determine that a difference between the first duty cycle and the second duty cycle is not within an accuracy limit; and determine the adjustment to the clock signal to correct the difference to be within the accuracy limit.

In Example 18, the subject matter of any one of Examples 16-17, wherein the link FSM, to determine the adjustment to the clock signal, is further to: determine that a duty cycle distortion (DCD) of the forward clock signal is not within a threshold range; and determine the adjustment to the clock signal to correct the DCD of the forward clock signal to be within the threshold range.

In Example 19, the subject matter of any one of Examples 16-18, wherein the DCA comprises: a rising-edge delay circuit coupled to the clock source and the link FSM; a falling-edge delay circuit coupled to the clock source and the link FSM, wherein the DCA to adjust the clock signal to generate the adjusted forward clock signal in view of the control signal comprises at least one of shifting, via the rising-edge delay circuit, the rising edge of the clock signal or shifting, via the falling-edge delay circuit, the falling edge of the clock signal to generate the adjusted forward clock signal; and an edge combiner circuit coupled to rising-edge delay circuit and the falling-edge delay circuit to combine a first adjusted forward clock signal, shifted by the rising-edge delay circuit, and a second adjusted forward clock signal, shifted by the falling-edge delay circuit, to generate the adjusted forward clock signal.

In Example 20, the subject matter of any one of Examples 16-19, wherein the link FSM to: send a first command code to the device to indicate commencement of the training period; enable the DCA, the DCM, and the front-end circuitry; initiate transmitting, by the front-end circuitry, the training sequence; receive, from the DCM, a lock indication that at least one of the first duty cycle has been adjusted within a defined range or the forward clock signal has reached a maximum accuracy limit; lock adjustment of the forward clock signal in view of the lock indication; and transmit a second command code to the device to indicate the training period is complete and to proceed to normal boot flow.

In Example 21, the subject matter of any one of Examples 16-20, wherein the DCM comprises: a delay locked loop/phase interpolator (DLL/PI) circuit to receive the forward clock signal and to generate a second signal; a buffer gate to receive the second signal from the DLL/PI circuit and to generate a third signal; an inverter gate to receive the second signal from the DLL/PI circuit and to generate a fourth signal; a first circuit to receive the third signal from the buffer gate and the strobe signal from the device, the first circuit to output a DR signal, wherein the first circuit is a first sampling circuit, a first latch, a first flip-flop circuit, or a first clock-based receiver circuit; a second circuit to receive the fourth signal from the inverter gate and the strobe signal from the device, the second circuit to output a DL signal, wherein the second circuit is a second sampling circuit, a second latch, a second flip-flop circuit, or a second clock-based receiver circuit; an XNOR gate to receive the DR signal from the first circuit and the DL signal from the second circuit and to generate a fifth signal to transmit to the link FSM; and an XOR gate to receive the DR signal from the first circuit and the DL signal from the second circuit and to generate a sixth signal to transmit to the link FSM, wherein the link FSM to determine the adjustment to the clock signal in view of the DR signal and the DL signal.

In Example 22, the subject matter of any one of Examples 16-21, wherein the host device further comprises: delay locked loop/phase interpolator (DLL/PI) circuitry to receive the strobe signal from the device and to generate a first signal; a first parallel-in/serial-out (PISO) register to receive a second signal from a first controller of the host device and the forward clock signal from the clock source, the first PISO register to generate a third signal; and a first serial-in/parallel-out (SIPO) register to receive a fourth signal from the device, the third signal from the first PISO register, and the first signal from the DLL/PI, the first SIPO register to output a fifth signal to the first controller.

In Example 23, the subject matter of any one of Examples 16-22, wherein the device further comprises: a second PISO register to receive a sixth signal from a second controller of the device, the second PISO register to generate a seventh signal; and a second SIPO register to receive an eighth signal from the host device and the seventh signal from the second PISO register, the second SIPO register to output a ninth signal to the second controller.

In Example 24, the subject matter of any one of Examples 16-23, wherein the host device is to generate the adjusted forward clock signal without receiving an acknowledgement from the device, wherein the host device is to one or more of: generate the adjusted forward clock signal through software; generate the adjusted forward clock signal as part of BIOS during boot time; or generate the adjusted forward clock signal in a functional mode.

Example 25 is an apparatus comprising means to perform a method of any one of Examples 9-15.

Example 26 is at least one machine readable medium comprising a plurality of instructions, when executed, to implement a method or realize an apparatus of any one of Examples 9-15.

Example 27 is an apparatus comprising means for performing the method of any one of Examples 9-15.

Example 28 is an apparatus comprising a processor configured to perform the method of any one of Examples 9-15.

Various embodiments can have different combinations of the structural features described above. For instance, all optional features of the computing system described above can also be implemented with respect to the method or process described herein and specifics in the examples can be used anywhere in one or more embodiments.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present disclosure.

The embodiments may be described with reference to timestamp validation of components in solid-state memory devices in specific integrated circuits, such as in computing platforms or microprocessors. The embodiments can also be applicable to other types of integrated circuits and programmable logic devices. For example, the disclosed embodiments are not limited to desktop computer systems or portable computers, such as the Intel® Ultrabooks™ computers, and can be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments can especially be used for low-end devices, like wearable devices (e.g., watches), electronic implants, sensory and control infrastructure devices, controllers, supervisory control and data acquisition (SCADA)

systems, or the like. Moreover, the apparatuses, methods, and systems described herein are not limited to physical computing devices, but can also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure can be provided as a computer program product or software which can include a machine or computer-readable medium having stored thereon instructions which can be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design can go through various stages, from creation to simulation to fabrication. Data representing a design can represent the design in a number of manners. First, as is useful in simulations, the hardware can be represented using a hardware description language or another functional description language. Additionally, a circuit level model with logic and/or transistor gates can be produced at some stages of the design process. Furthermore, most designs, at some stage, reach a level of data representing the physical placement of various devices in the hardware model. In the case where conventional semiconductor fabrication techniques are used, the data representing the hardware model can be the data specifying the presence or absence of various features on different mask layers for masks used to produce the integrated circuit. In any representation of the design, the data can be stored in any form of a machine readable medium. A memory or a magnetic or optical storage such as a disc can be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider can store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the microcontroller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) can refer to the combination of the microcontroller and the non-transitory medium. Often module boundaries that are illustrated as separate commonly vary and potentially overlap. For example, a first and a second module can share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate can provide a 0 or a 1 during operation. But a logic gate 'configured to' provide an enable signal to a clock does not include every potential logic gate that can provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, can be capable of holding a single logical value or multiple logical values. However, other representations of values in computer systems have been used. For example the decimal number ten can also be represented as a binary value of 1010 and a hexadecimal letter A. Therefore, a value includes any representation of information capable of being held in a computer system.

Moreover, states can be represented by values or portions of values. As an example, a first value, such as a logical one, can represent a default or initial state, while a second value, such as a logical zero, can represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values can be utilized to represent any number of states.

The embodiments of methods, hardware, software, firmware or code set forth above can be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that can receive information there from.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium can include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics can be combined in any suitable manner in one or more embodiments.

In the foregoing specification, a detailed description has been given with reference to specific exemplary embodiments. It will, however, be evident that various modifications and changes can be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but can refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "generating," "transmitting," "receiving," "monitoring,"

"determining," "adjusting," "shifting," "sending," "enabling," "initiating," "locking," "defining," "issuing," "linking," "associating," "obtaining," "authenticating," "prohibiting," "executing," "requesting," "communicating," "transmitting," "detecting," "setting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and can not necessarily have an ordinal meaning according to their numerical designation.

What is claimed is:

1. A host device comprising:
    a clock source to generate a clock signal;
    front-end circuitry coupled to the clock source, the front-end circuitry to transmit, to a device over a physical transmission media, a training sequence and a forward clock signal derived from the clock signal during a training period and the front-end circuitry to receive a strobe signal from the device over the physical transmission media during the training period;
    a duty cycle monitor (DCM) coupled to the clock source and the front-end circuitry, the DCM to monitor a first duty cycle of the strobe signal and a second duty cycle of the clock signal during the training period;
    link training logic coupled to the DCM, the link training logic to determine an adjustment to the clock signal to correct the forward clock signal to obtain an adjusted forward clock signal for communications between the host device and the device after the training period, and the link training logic to generate a control signal in view of the adjustment to correct the forward clock signal; and
    a duty cycle adjustor (DCA) coupled between the clock source and the front-end circuitry and coupled to the DCM, the DCA to receive the clock signal from the clock source and the control signal from the DCM and the DCA to adjust the clock signal to generate the adjusted forward clock signal in view of the control signal.

2. The host device of claim 1, wherein the link training logic to determine the adjustment to the clock signal comprises:
    determining that a difference between the first duty cycle and the second duty cycle is not within an accuracy limit; and
    determining the adjustment to the clock signal to correct the difference to be within the accuracy limit.

3. The host device of claim 1, wherein the link training logic to determine the adjustment to the clock signal comprises:
    determining that a duty cycle distortion (DCD) of the forward clock signal is not within a threshold range; and
    determining the adjustment to the clock signal to correct the DCD of the forward clock signal to be within the threshold range.

4. The host device of claim 1, wherein the DCA comprises:
    a rising-edge delay circuit coupled to the clock source and the link training logic; and
    a falling-edge delay circuit coupled to the clock source and the link training logic, wherein the DCA to adjust the clock signal to generate the adjusted forward clock signal in view of the control signal comprises at least one of shifting, via the rising-edge delay circuit, a rising edge of the clock signal or shifting, via the falling-edge delay circuit, a falling edge of the clock signal to generate the adjusted forward clock signal.

5. The host device of claim 4, wherein the DCA further comprises an edge combiner circuit coupled to rising-edge delay circuit and the falling-edge delay circuit to combine a first adjusted forward clock signal, shifted by the rising-edge delay circuit, and a second adjusted forward clock signal, shifted by the falling-edge delay circuit, to generate the adjusted forward clock signal.

6. The host device of claim 1, wherein the link training logic comprises a link finite state machine (FSM), the link FSM to:
    send a first command code to the device to indicate commencement of the training period;
    enable the DCA, the DCM, and the front-end circuitry;
    initiate transmitting, by the front-end circuitry, the training sequence;
    receive, from the DCM, a lock indication that at least one of the first duty cycle has been adjusted within a defined range or the forward clock signal has reached a maximum accuracy limit;
    lock adjustment of the forward clock signal in view of the lock indication; and
    transmit a second command code to the device to indicate the training period is complete and to proceed to normal boot flow.

7. The host device of claim 1, wherein the DCM comprises:
    a delay locked loop/phase interpolator (DLL/PI) circuit to receive the forward clock signal and to generate a second signal;
    a buffer gate to receive the second signal from the DLL/PI circuit and to generate a third signal;
    an inverter gate to receive the second signal from the DLL/PI circuit and to generate a fourth signal;
    a first circuit to receive the third signal from the buffer gate and the strobe signal from the device, the first circuit to output a DR signal, wherein the first circuit is a first sampling circuit, a first latch, a first flip-flop circuit, or a first clock-based receiver circuit;

a second circuit to receive the fourth signal from the inverter gate and the strobe signal from the device, the second circuit to output a DL signal, wherein the second circuit is a second sampling circuit, a second latch, a second flip-flop circuit, or a second clock-based receiver circuit;

an XNOR gate to receive the DR signal from the first circuit and the DL signal from the second circuit and to generate a fifth signal to transmit to the link training logic; and an XOR gate to receive the DR signal from the first circuit and the DL signal from the second circuit and to generate a sixth signal to transmit to the link training logic, wherein the link training logic to determine the adjustment to the clock signal in view of the DR signal and the DL signal.

8. The host device of claim 1, wherein the host device is to generate the adjusted forward clock signal without receiving an acknowledgement from the device, wherein the host device is to one or more of:

generate the adjusted forward clock signal through software;

generate the adjusted forward clock signal as part of BIOS during boot time; or generate the adjusted forward clock signal in a functional mode.

9. A method comprising:

generating, via a clock source of a host device, a clock signal;

transmitting, via front-end circuitry of the host device coupled to the clock source to a device over a physical transmission media during a training period, a training sequence and a forward clock signal derived from the clock signal;

receiving, via the front-end circuitry from the device over the physical transmission media, a strobe signal during the training period;

monitoring, via a duty cycle monitor (DCM) of the host device coupled to the clock source and the front-end circuitry, a first duty cycle of the strobe signal and a second duty cycle of the clock signal during the training period;

determining, via link training logic of the host device coupled to the DCM, an adjustment to the clock signal to correct the forward clock signal to obtain an adjusted forward clock signal for communications between the host device and the device after the training period;

generating, via the link training logic, a control signal in view of the adjustment to correct the forward clock signal;

receiving, via a duty cycle adjustor (DCA) of the host device coupled between the clock source and the front-end circuitry and coupled to the DCM, the clock signal from the clock source and the control signal from the DCM; and adjusting, via the DCA, the clock signal to generate the adjusted forward clock signal in view of the control signal.

10. The method of claim 9, wherein the determining of the adjustment to the clock signal comprises:

determining that a difference between the first duty cycle and the second duty cycle is not within an accuracy limit; and determining the adjustment to the clock signal to correct the difference to be within the accuracy limit.

11. The method of claim 9, wherein the determining of the adjustment to the clock signal comprises:

determining that a duty cycle distortion (DCD) of the forward clock signal is not within a threshold range; and determining the adjustment to the clock signal to correct the DCD of the forward clock signal to be within the threshold range.

12. The method of claim 9, wherein the adjusting of the clock signal to generate the adjusted forward clock signal in view of the control signal comprises at least one of:

shifting, via a rising-edge delay circuit of the DCA coupled to the clock source and the link training logic, a rising edge of the clock signal to generate the adjusted forward clock signal; or shifting, via a falling-edge delay circuit of the DCA coupled to the clock source and the link training logic, a falling edge of the clock signal to generate the adjusted forward clock signal.

13. The method of claim 12, wherein the adjusting of the clock signal to generate the adjusted forward clock signal in view of the control signal comprises combining, via an edge combiner circuit of the DCA, the edge combiner circuit being coupled to rising-edge delay circuit and the falling-edge delay circuit, a first adjusted forward clock signal, shifted by the rising-edge delay circuit, and a second adjusted forward clock signal, shifted by the falling-edge delay circuit, to generate the adjusted forward clock signal.

14. The method of claim 9 further comprising:

sending, via a link finite state machine (FSM) of the link training logic, a first command code to the device to indicate commencement of the training period;

enabling, via the link FSM, the DCA, the DCM, and the front-end circuitry;

initiating, via the link FSM, transmitting, by the front-end circuitry, the training sequence;

receiving, via the link FSM from the DCM, a lock indication that at least one of the first duty cycle has been adjusted within a defined range or the forward clock signal has reached a maximum accuracy limit;

locking, via the link FSM, adjustment of the forward clock signal in view of the lock indication; and transmitting, via the link FSM to the device, a second command code to indicate the training period is complete and to proceed to normal boot flow.

15. The method of claim 9, wherein the adjusting of the clock signal to generate the adjusted forward clock signal is without receiving an acknowledgement from the device, wherein the adjusting of the clock signal to generate the adjusted forward clock signal is one or more of through software, as part of BIOS during boot time, or in a functional mode.

16. A system comprising:

a physical transmission media;

a device coupled to the physical transmission media; and a host device coupled to physical transmission media, the host device comprising:

a clock source to generate a clock signal;

front-end circuitry coupled to the clock source, the front-end circuitry to transmit, to the device over the physical transmission media, a training sequence and a forward clock signal derived from the clock signal during a training period and the front-end circuitry to receive a strobe signal from the device over the physical transmission media during the training period;

a duty cycle monitor (DCM) coupled to the clock source and the front-end circuitry, the DCM to monitor a first duty cycle of the strobe signal and a second duty cycle of the clock signal during the training period;

a link finite state machine (FSM) coupled to the DCM, the link FSM to determine an adjustment to the clock signal to correct the forward clock signal to obtain an adjusted forward clock signal for communications between the host device and the device after the training period, and the link FSM to generate a control signal in view of the adjustment to correct the forward clock signal; and a duty cycle adjustor (DCA) coupled between the clock source and the front-end circuitry and coupled to the DCM, the DCA to receive the clock signal from the clock source and the control signal from the DCM and the DCA to adjust the clock signal to generate the adjusted forward clock signal in view of the control signal.

17. The system of claim 16, wherein the link FSM, to determine the adjustment to the clock signal, is further to:
determine that a difference between the first duty cycle and the second duty cycle is not within an accuracy limit; and
determine the adjustment to the clock signal to correct the difference to be within the accuracy limit.

18. The system of claim 16, wherein the link FSM, to determine the adjustment to the clock signal, is further to:
determine that a duty cycle distortion (DCD) of the forward clock signal is not within a threshold range; and
determine the adjustment to the clock signal to correct the DCD of the forward clock signal to be within the threshold range.

19. The system of claim 16, wherein the DCA comprises:
a rising-edge delay circuit coupled to the clock source and the link FSM;
a falling-edge delay circuit coupled to the clock source and the link FSM, wherein the DCA to adjust the clock signal to generate the adjusted forward clock signal in view of the control signal comprises at least one of shifting, via the rising-edge delay circuit, a rising edge of the clock signal or shifting, via the falling-edge delay circuit, a falling edge of the clock signal to generate the adjusted forward clock signal; and
an edge combiner circuit coupled to rising-edge delay circuit and the falling-edge delay circuit to combine a first adjusted forward clock signal, shifted by the rising-edge delay circuit, and a second adjusted forward clock signal, shifted by the falling-edge delay circuit, to generate the adjusted forward clock signal.

20. The system of claim 16, wherein the link FSM to:
send a first command code to the device to indicate commencement of the training period;
enable the DCA, the DCM, and the front-end circuitry;
initiate transmitting, by the front-end circuitry, the training sequence;
receive, from the DCM, a lock indication that at least one of the first duty cycle has been adjusted within a defined range or the forward clock signal has reached a maximum accuracy limit;
lock adjustment of the forward clock signal in view of the lock indication; and
transmit a second command code to the device to indicate the training period is complete and to proceed to normal boot flow.

21. The system of claim 16, wherein the DCM comprises:
a delay locked loop/phase interpolator (DLL/PI) circuit to receive the forward clock signal and to generate a second signal;
a buffer gate to receive the second signal from the DLL/PI circuit and to generate a third signal;
an inverter gate to receive the second signal from the DLL/PI circuit and to generate a fourth signal;
a first circuit to receive the third signal from the buffer gate and the strobe signal from the device, the first circuit to output a DR signal, wherein the first circuit is a first sampling circuit, a first latch, a first flip-flop circuit, or a first clock-based receiver circuit;
a second circuit to receive the fourth signal from the inverter gate and the strobe signal from the device, the second circuit to output a DL signal, wherein the second circuit is a second sampling circuit, a second latch, a second flip-flop circuit, or a second clock-based receiver circuit;
an XNOR gate to receive the DR signal from the first circuit and the DL signal from the second circuit and to generate a fifth signal to transmit to the link FSM; and
an XOR gate to receive the DR signal from the first circuit and the DL signal from the second circuit and to generate a sixth signal to transmit to the link FSM, wherein the link FSM to determine the adjustment to the clock signal in view of the DR signal and the DL signal.

22. The system of claim 16, wherein the host device further comprises:
delay locked loop/phase interpolator (DLL/PI) circuitry to receive the strobe signal from the device and to generate a first signal;
a first parallel-in/serial-out (PISO) register to receive a second signal from a first controller of the host device and the forward clock signal from the clock source, the first PISO register to generate a third signal; and
a first serial-in/parallel-out (SIPO) register to receive a fourth signal from the device, the third signal from the first PISO register, and the first signal from the DLL/PI, the first SIPO register to output a fifth signal to the first controller.

23. The system of claim 22, wherein the device further comprises:
a second PISO register to receive a sixth signal from a second controller of the device, the second PISO register to generate a seventh signal; and
a second SIPO register to receive an eighth signal from the host device and the seventh signal from the second PISO register, the second SIPO register to output a ninth signal to the second controller.

24. The system of claim 16, wherein the host device is to generate the adjusted forward clock signal without receiving an acknowledgement from the device, wherein the host device is to one or more of:
generate the adjusted forward clock signal through software;
generate the adjusted forward clock signal as part of BIOS during boot time; or
generate the adjusted forward clock signal in a functional mode.

\* \* \* \* \*